United States Patent
Stewart et al.

(10) Patent No.: US 9,098,119 B2
(45) Date of Patent: Aug. 4, 2015

(54) RECESSED KEYS FOR NON-MECHANICAL KEYS

(71) Applicant: Lenovo (Singapore) Pte. Ltd., Singapore (SG)

(72) Inventors: Aaron Michael Stewart, Raleigh, NC (US); Christopher Miles Osborne, Cary, NC (US); Hiroki Hirano, Kanagawa-ken (JP); Masaaki Neguchi, Tokyo (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/848,400

(22) Filed: Mar. 21, 2013

(65) Prior Publication Data

US 2014/0285440 A1    Sep. 25, 2014

(51) Int. Cl.
G09G 5/00      (2006.01)
G06F 3/02      (2006.01)
G06F 1/16      (2006.01)

(52) U.S. Cl.
CPC ............ *G06F 3/0219* (2013.01); *G06F 1/1671* (2013.01)

(58) Field of Classification Search
CPC ... G06F 3/0488; G06F 3/04883; G06F 3/044; G06F 1/1662; G06F 1/1664; G06F 1/1666; G06F 1/1667; G06F 1/1669; G06F 1/1671; G06F 1/1673; G06F 1/1626
USPC ............... 345/169, 173–178, 156; 455/556.1, 455/556.2, 566
See application file for complete search history.

(56) References Cited

U.S. PATENT DOCUMENTS

| | | | |
|---|---|---|---|
| 7,423,634 B2 * | 9/2008 | Amiri | 345/168 |
| 8,325,068 B2 * | 12/2012 | Wong et al. | 341/27 |
| 8,692,783 B2 * | 4/2014 | Shamir et al. | 345/173 |
| 2007/0144795 A1 * | 6/2007 | Tran | 178/18.06 |
| 2007/0171205 A1 * | 7/2007 | Steinberg | 345/168 |
| 2009/0073128 A1 * | 3/2009 | Marsden | 345/168 |
| 2011/0109556 A1 | 5/2011 | Ganey et al. | |
| 2011/0110697 A1 | 5/2011 | Ganey et al. | |
| 2012/0169671 A1 * | 7/2012 | Yasutake | 345/175 |
| 2013/0002595 A1 * | 1/2013 | Asagi | 345/173 |

* cited by examiner

*Primary Examiner* — Jennifer Nguyen
(74) *Attorney, Agent, or Firm* — Ference & Associates LLC

(57) ABSTRACT

An embodiment provides an apparatus, including: an input device having one or more keys; and a controller receiving input from the one or more keys; one or more of the one or more keys having a recessed surface relative to a bezel surface of the input device; the recessed surface responding to user input in the absence of mechanical displacement. Other aspects are described and claimed.

19 Claims, 5 Drawing Sheets

RECESSED KEYS FOR NON-MECHANICAL KEYS

BACKGROUND

Information handling devices ("devices") come in a variety of forms, for example laptop computing devices, tablet computing devices, smart phones, e-readers, MP3 players, and the like. Many such devices include or are used in combination with keyboards.

With the multiplicity of form factors available, many different keyboard and user input designs are utilized. For example, more traditional keyboards are often omitted in certain devices such as smart phones and tablet computers in favor of "soft keys", i.e., keys areas implemented on a touch or gesture interactive surface such as a touch screen. Moreover, other devices are designed to include a keyboard interface on a touch screen as well as a physical keyboard. In some cases the physical keyboards are detachable from the device.

The available keyboards include those having conventional mechanical keys areas (i.e., keys that are mechanically displaceable on depression by a user providing a key stroke) and keyboards including non-mechanical keys, i.e., not mechanically displaceable but accepting input using non-mechanically sensed input, e.g., touch detection. Non-mechanical keyboards have become popular. Non-mechanical keyboards include touch based keyboards such as implemented on a touch screen as well as membrane keyboards.

Thin, non-mechanical keyboards are popular due to their low weight and thinness. As an example, the MICROSOFT SURFACE tablet computer is optionally outfitted with a membrane keyboard. Instead of using mechanical keys that displace (i.e., travel and engage an underlying switch), the membrane keyboards leverage technologies such as capacitive and resistive sensors to determine when a user is pushing on a key. The result is a thin, mostly flat, one piece keyboard.

BRIEF SUMMARY

In summary, one aspect provides an apparatus, comprising: an input device having one or more keys; and a controller receiving input from the one or more keys; one or more of the one or more keys having a recessed surface relative to a bezel surface of the input device; the recessed surface responding to user input in the absence of mechanical displacement.

Another aspect provides an information handling device, comprising: one or more processors; and a keyboard providing input to the one or more processors; the keyboard comprising one or more keys; one or more of the one or more keys having a recessed surface relative to a bezel surface of the keyboard; the recessed surface responding to user input in the absence of mechanical displacement.

A further aspect provides an information handling device, comprising: one or more processors; a display device having a display surface; and a keyboard providing input to the one or more processors; the keyboard comprising one or more keys and a bezel surface; one or more of the one or more keys having a recessed surface relative to a bezel surface of the keyboard; the display device and the keyboard being arranged in a clamshell configuration such that when the clamshell is closed, the display surface contacts the bezel surface but does not contact the recessed surface of the one or more keys.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although thin and light, membrane keyboards are hard to use for many users as they desire a more tactilely discernable definition for the keys in the keyboard. In the tradition of typewriters and PC keyboards, membrane keyboards implement a key that is proud of (projects or protrudes from) the surrounding bezel surface (main plane of the keyboard). Because the overall thickness of the flat keyboards is so small, the relative height of these keys over the bezel surface is very small (e.g., 0.1 mm or 0.2 mm in height). Very short relative key height, a flat key top shape and tight spacing between adjacent keys do not create tactilely discernable definition of the keys. This in turn frustrates many touch typists because there is no tactile cue provided.

In contrast to conventional membrane keyboard keys, an embodiment implements a unique dish shape across the width of a key. This dish shape includes a compound curve or recess formed in the key. This subtle tactile cue helps a user align the fingers on the respective keys. An embodiment applies this feature in the context of a non-mechanical/flat/membrane keyboard to provide key(s) having recessed surface(s).

The description now turns to the figures in which certain example embodiments are shown. The example embodiments will be best understood with reference to the figures, and these embodiments, described and illustrated, are non-limiting examples of possible embodiments.

Figure 1:
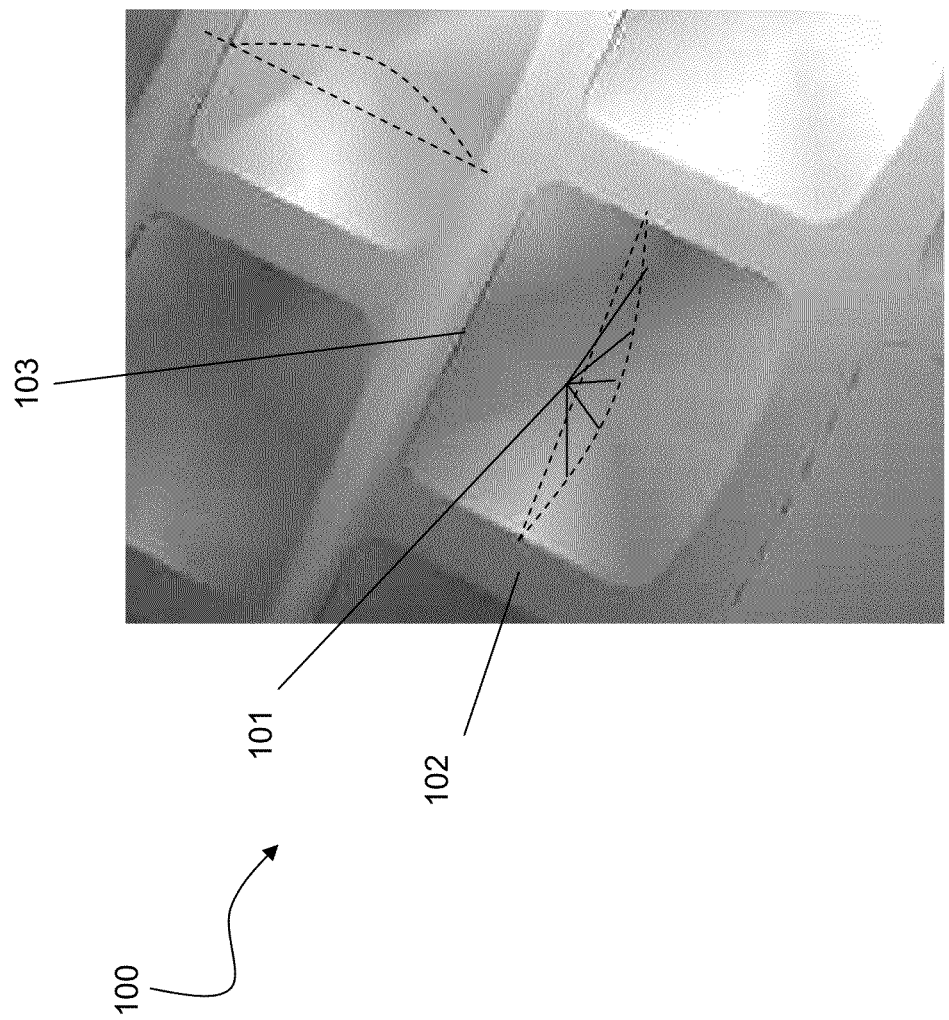
FIG. 1 illustrates an example of keys having a recessed surface.

Referring to FIG. 1, a dish shape (referring to the dashed lines indicating a recess into the (portion of) the illustrated keyboard 100) is provided to a key surface to create a recessed key surface 101, i.e., a surface that is recessed relative to the peripheral edge of the key top and/or the main surface or bezel plane 102 of the flat keyboard 100. The keyboard 100 may be a QWERTY keyboard. Because the dish or recess depth is less than about 0.5 mm, relative depth impact to the overall keyboard 100 thickness is minimal. That is, referring to FIG. 3, the flat keyboard 100 of an embodiment has a thickness profile on the order of several millimeters, commensurate with other membrane keyboards, e.g., the MICROSOFT SURFACE membrane keyboard.

Figure 2:
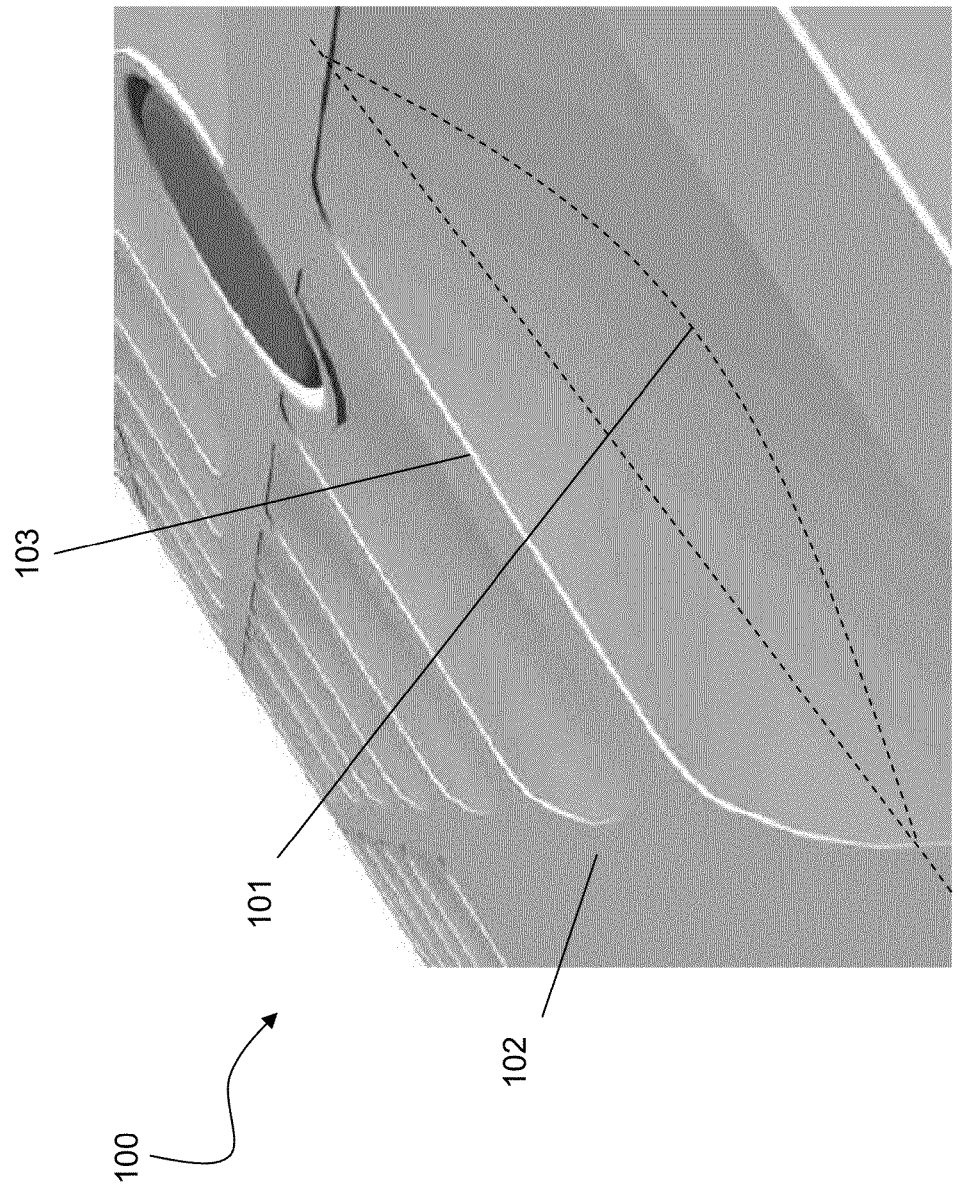
FIG. 2 illustrates an example of keys having a recessed surface.

Additionally or alternatively, referring back to FIG. 1 and additionally to FIG. 2, a recessed lip 103 may be implemented around the perimeter edge of, e.g., the recessed key surface 101, to help tactilely and/or visually delineate the perimeter of the key surface. Thus, a peripheral edge of a key having a recessed surface may be positioned such that a lip is defined between the bezel surface and the peripheral edge of the key. The lip may have a depth of about 0.1 to 0.5 mm.

The recessed/dished key surface 101 and/or a recessed lip 103 implementation may be used across all of the key surfaces in the keyboard 100. In the alternative, just a subset of the key surfaces 101 may be recessed and/or have the lip 103 implemented. For example, the home row of the key surfaces 101 in an array may use the recess surface 101 and/or lip 103 features as aligning cue(s), whereas remaining keys may not. The home row of keys includes at least an "A" key, an "S" key, a "D" key, an "F" key, a "J" key, a "K" key, an "L" key and a ":" key. With the home row as a strong alignment cue for touch typists already, implementing one or more structures such as the recessed key surface 101 and/or the lip 103 provides additional feedback in the keyboard 100 and supplies useful orientation information to the user when touch typing. Other keys may have a flat surface, e.g., a space key.

As may be appreciated from FIG. 1, the recess key surface 101 may be shaped to accommodate a finger tip, e.g., spherical or nearly spherical, such that a rounded or ovular recess is formed in the key. This provides tactile and visual feedback for a user.

The key (or keys) having a recessed key surface 101 may be non-mechanical keys. That is, a recessed key surface may include touch or other input sensing technology such that a user may provide input to a recessed key surface 101 without mechanically depressing the recessed key surface 101. Depending on the touch or sensing technology utilized, the user may or may not have to physically touch the recessed key surface 101 to provide input. For example, in the case of capacitive touch sensing technology, a user would place his or her finger tip on the recessed key surface 101, but would not have to mechanically displace the recessed key surface 101, in order to provide key input (e.g., provide input to a controller or a processor of a device corresponding to a letter or function of the keyboard key).

Figure 3:
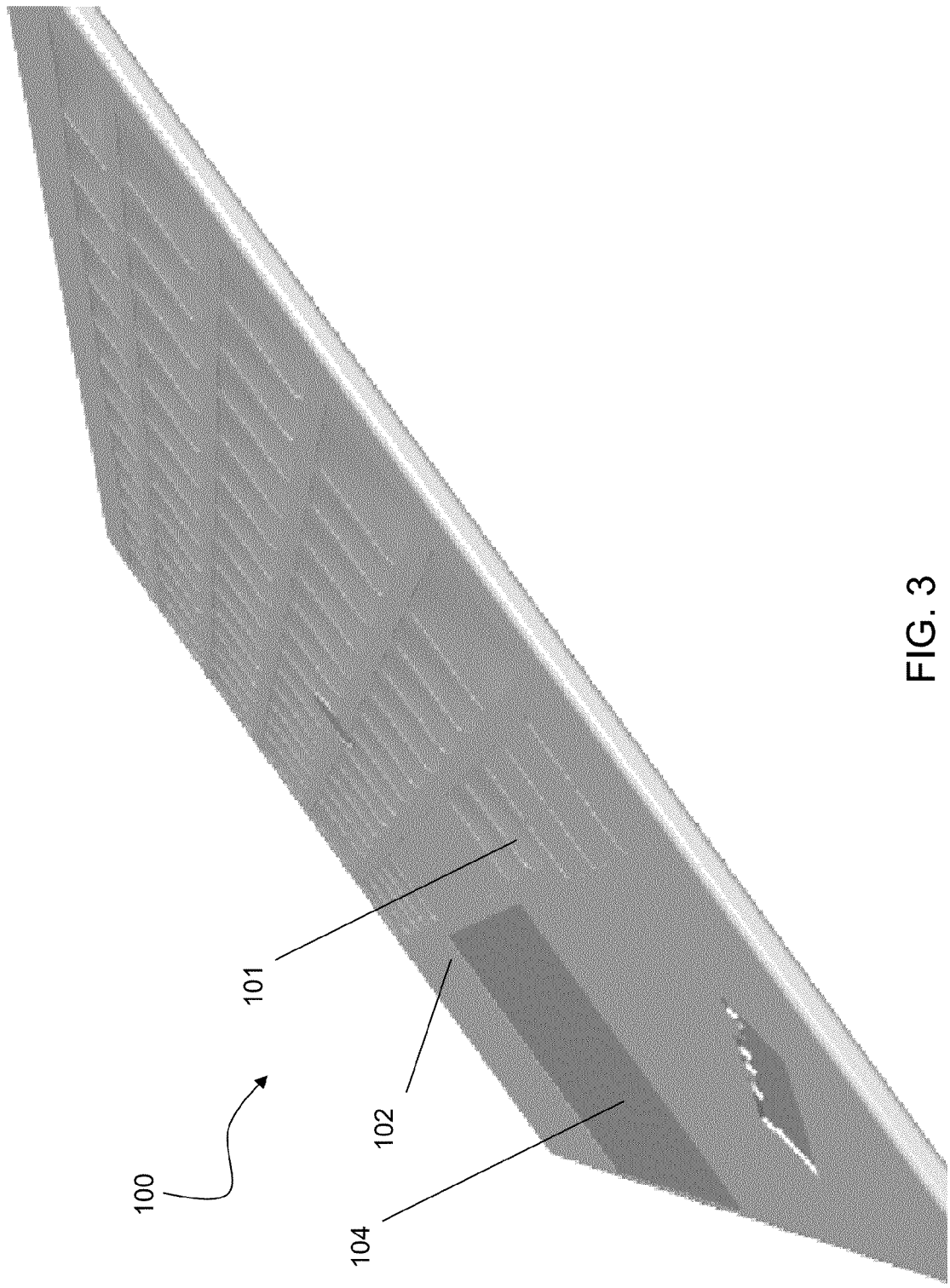
FIG. 3 illustrates an example of keys having a recessed surface included with a keyboard.
Figure 4:
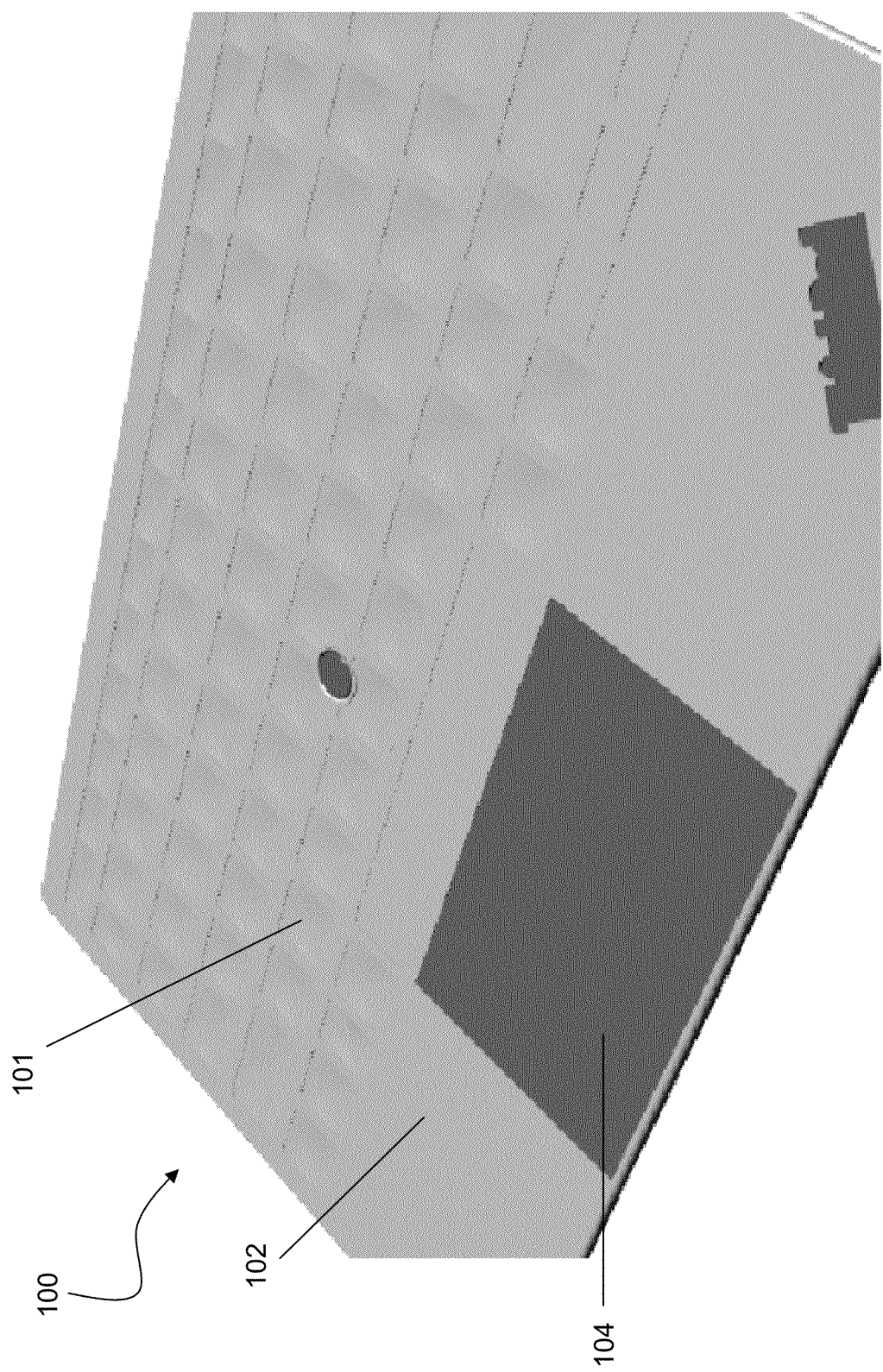
FIG. 4 illustrates an example of keys having a recessed surface included with a keyboard.

Turning to FIG. 3 and FIG. 4, it may be appreciated from these illustrations that such recessed key surfaces 101 may be implemented in full keyboards. That is, other components, for example a touch pad or touch surface 104, may be included in the keyboard 100 along with one or more keys having recessed surfaces 101. The recessed key surfaces 101 of recessed keys may be provided in a variety of arrays, for example in a conventional QWERTY keyboard array as illustrated in FIG. 4. Again, one or more recessed keys, one or more subsets of recessed keys, or suitable combinations of the foregoing may be utilized in various devices.

It will further be appreciated that a keyboard including one or more keys having a recessed surface 101 may be used in connection with an information handling device, e.g., a laptop computer, a notebook computer, a desktop computer, a tablet computer or any of a variety of other devices. The information handling device may receive and respond to information or signals sent from such a keyboard. Furthermore, the keyboard having one or more keys having a recessed surface 101 may be connected, e.g., via a wired or wireless connection, to the information handling device, or, the keyboard or other input device having the one or more keys having a recessed surface 101 may be integrated (be a part of or embedded with) the information handling device. In an embodiment, the keyboard itself may be considered an information handling device.

An embodiment therefore provides for non-mechanical/flat keyboards having physical structure that creates cue(s) that help a user align his or her fingers to the center of the keys and/or feel the perimeter of keys, both of which are cues for the typical touch typing experience. The various embodiments therefore offer a user with a more traditional touch typing experience when compared to conventional membrane keyboards.

Figure 5:
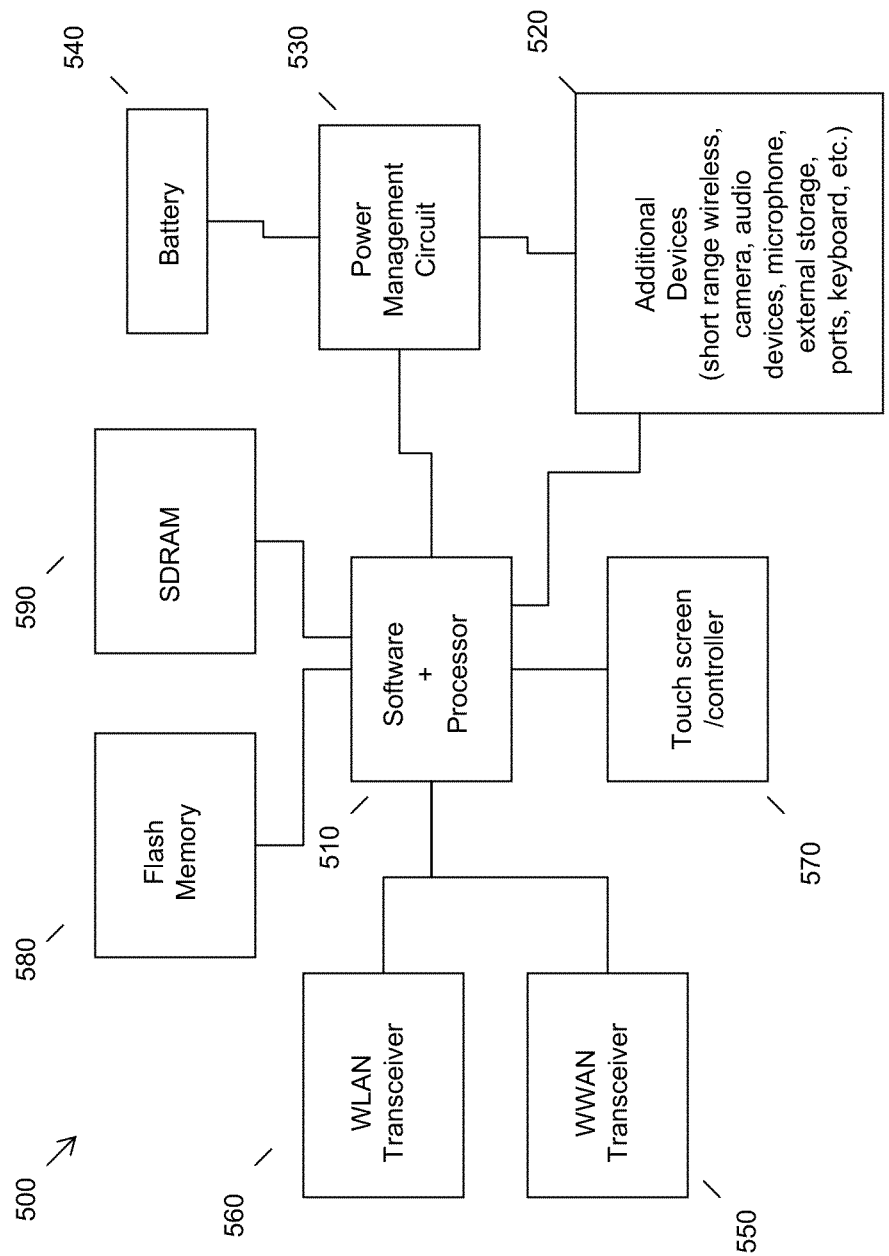
FIG. 5 illustrates example circuitry of an information handling device.

Referring to FIG. 5, while various other circuits, circuitry or components may be utilized, with regard to laptop, smart phone and/or tablet circuitry 300, an example illustrated in FIG. 5 includes an ARM based system (system on a chip) design, with software and processor(s) combined in a single chip 510. Internal busses and the like depend on different vendors, but essentially all the peripheral devices (520) may attach to a single chip 510. The circuitry 500 combines the processor, memory control, and I/O controller hub all into a single chip 510. Also, ARM based systems 500 do not typically use SATA or PCI or LPC. Common interfaces for example include SDIO and I2C.

There are power management chip(s) 530, e.g., a battery management unit, BMU, which manage power as supplied for example via a rechargeable battery 540, which may be recharged by a connection to a power source. The circuitry 500 may thus be included in a device such as the information handling device including a user interface such as a keyboard having key(s) that include a recessed surface and/or a lip implementation, as described herein. In at least one design, a single chip, such as 510, is used to supply BIOS like functionality and DRAM memory.

ARM based systems 500 typically include one or more of a WWAN transceiver 550 and a WLAN transceiver 560 for connecting to various networks, such as telecommunications networks and wireless base stations. Commonly, an ARM based system 500 will include a touch screen 570 for data input and display. ARM based systems 500 also typically include various memory devices, for example flash memory 580 and SDRAM 590.

Information handling devices, as for example outlined in FIG. 5, may include or be connected to or otherwise couple to work with other devices, for example a keyboard having one or more keys including a recessed surface and/or a lip, as described herein. It should be noted, however, that the examples of FIG. 1-4 and the circuitry of FIG. 5 are examples only, and other examples commensurate with this disclosure may be used. Moreover, although specific illustrations and implementations of tactile and visual cues have been focused on herein, including for example the measurements, layouts and features used in the figures as representative examples, other embodiments may be implemented using other suitable features that are commensurate with the embodiments described as examples.

As will be appreciated by one skilled in the art, various aspects may be embodied as a system, method or device program product. Accordingly, aspects may take the form of an entirely hardware embodiment or an embodiment including software that may all generally be referred to herein as a "circuit," "element" or "system." Furthermore, aspects may take the form of a device program product embodied in one or more device readable medium(s) having device readable program code embodied therewith.

Any combination of one or more non-signal device readable medium(s) may be utilized. A storage medium is a non-signal medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An apparatus, comprising:
   an input device having a bezel surface with a substantially flat plane and one or more keys; and
   a controller receiving input from the one or more keys;
   one or more of the one or more keys having a recessed surface relative to the bezel surface of the input device;
   the recessed surface responding to user input in the absence of mechanical displacement;
   wherein a peripheral edge of at least one key having a recessed surface additionally has a lip defined between the bezel surface and the peripheral edge of the at least one key; and
   wherein said at least one key is not mechanically displaceable.

2. The apparatus of claim 1, wherein the recessed surface comprises a touch sensitive surface.

3. The apparatus of claim 2, wherein the touch sensitive surface is a capacitive surface or a resistive surface.

4. The apparatus of claim 1, wherein the recessed surface comprises a compound curve having a curve about both a horizontal and a vertical axis.

5. The apparatus of claim 4, wherein the recessed surface has a depth below the bezel surface of not more than about 0.5 mm.

6. The apparatus of claim 1, wherein the one or more keys comprise a plurality of keys having a recessed surface relative to the bezel surface.

7. The apparatus of claim 6, wherein the plurality of keys having a recessed surface relative to the bezel surface includes a home row of keys.

8. The apparatus of claim 1, wherein the plurality of keys comprises one or more subsets of keys, wherein one or more other keys do not include a recessed surface.

9. The apparatus of claim 1, wherein the lip comprises a cutout in the bezel having a depth of about 0.1 to 0.5 mm.

10. An information handling device, comprising:
    one or more processors; and
    a keyboard providing input to the one or more processors;
    the keyboard having a bezel surface with a substantially flat plane and comprising one or more keys;
    one or more of the one or more keys having a recessed surface relative to the bezel surface of the keyboard;
    the recessed surface responding to user input in the absence of mechanical displacement;
    wherein a peripheral edge of at least one key having a recessed surface additionally has a lip defined between the bezel surface and the peripheral edge of the at least one key; and
    wherein said at least one key is not mechanically displaceable.

11. The information handling device of claim 10, wherein the recessed surface comprises a touch sensitive surface.

12. The information handling device of claim 11, wherein the touch sensitive surface is a capacitive surface or a resistive surface.

13. The information handling device of claim 10, wherein the recessed surface comprises a compound curve having a curve about both a horizontal and a vertical axis.

14. The information handling device of claim 13, wherein the recessed surface has a depth below the bezel surface of not more than about 0.5 mm.

15. The information handling device of claim 10, wherein the one or more keys comprise a plurality of keys having a recessed surface relative to the bezel surface.

16. The information handling device of claim 15, wherein the plurality of keys having a recessed surface relative to the bezel surface includes a home row of keys.

17. The information handling device of claim 10, wherein the plurality of keys comprises one or more subsets of keys, wherein one or more other keys do not include a recessed surface.

18. The information handling device of claim 10, wherein the lip comprises a depth of about 0.1 to 0.5 mm.

19. An information handling device, comprising:
one or more processors;
a display device having a display surface; and
a keyboard providing input to the one or more processors;
the keyboard having a bezel surface with a substantially flat plane and comprising one or more keys and a bezel surface;
one or more of the one or more keys having a recessed surface relative to the bezel surface of the keyboard;
the display device and the keyboard being arranged in a clamshell configuration such that when the clamshell is closed, the display surface contacts the bezel surface but does not contact the recessed surface of the one or more keys;
wherein a peripheral edge of at least one key having a recessed surface additionally has a lip defined between the bezel surface and the peripheral edge of the at least one key; and
wherein said at least one key is not mechanically displaceable.

* * * * *